Aug. 31, 1943.  C. B. EGOLF  2,328,525

METHOD OF PREPARING SHEETS

Filed Aug. 23, 1941

WITNESS:

INVENTOR

Charles B. Egolf
BY
T. Wallace Ginn
ATTORNEY.

UNITED STATES PATENT OFFICE 2,328,525

METHOD OF PREPARING SHEETS

Charles B. Egolf, Philadelphia, Pa., assignor to Röhm & Haas Company, Philadelphia, Pa.

Application August 23, 1941, Serial No. 408,035

3 Claims. (Cl. 18—58)

The present invention relates to the manufacture of sheets of polymeric materials, and more particularly to improvements in methods heretofore employed for the formation of such sheets.

A method heretofore extensively employed in the formation of sheets of polymerized material comprised introducing a liquid polymerizable material, such as a methyl-$\alpha$-methacrylate, styrol or mixtures thereof into a cell formed of two sheets of metal or of glass spaced from each other by narrow strips of elastic material or spacers, which, during the heat treatment to which the polymerizable material is subjected to effect polymerization, are or become sufficiently plastic to permit the two sheets forming the cell walls to move toward each other as the material therebetween contract. The cell walls are held against the narrow strips or spacers and closed along their edges by means of a yieldable material, such as paper, coated on one side with an adhesive which will adhere to the sides of the metal or glass sheets adjacent their edges. Considerable time is consumed in making cells of the type described above and, in addition to the time so consumed, the cells have to be laid aside to permit the adhesive between the yieldable material and the cell walls to dry before they are filled. The method aforesaid is disclosed in U. S. Patent No. 2,154,639.

In forming sheets of polymerized material in a cell of the type referred to above, difficulty has been encountered in that the liquid polymerizable material introduced into the cell, by reason of the construction of the latter, flows around the edges of the cell walls and, when polymerization takes place with incident contraction of the material within the cell, a longitudinal strain is placed upon the cell walls. The plate glass sheets of which the cells are preferably constructed are thus subject to breakage which often occurs. There is also encountered substantial chipping of the edges of the glass sheets and anchoring of the sheet of polymer within the cell which makes removal of the cell walls from the polymeric sheet a difficult problem. In the separation of cells used in accordance with this prior practice it is necessary to place the cells in a solution which will disintegrate the adhesive that holds the paper or other yieldable material to the edges of the cell walls. This makes a subsequent thorough washing of both the cell walls and the plastic sheet necessary steps of the process.

It has now been found that sheets of polymerized material may be formed in a considerably more satisfactory and less time-consuming manner by using removable spacers between the two sheets that make up the walls of the cell and, after polymerization of the material within the cell has taken place to the point where the material has set to a gel-like mass, removing the spacers and continuing polymerization to completion. Employment of removable spacers between the cell walls as aforesaid prevents the liquid polymerizable material from reaching the edges thereof and anchoring the sheet of finished polymer in the cell. The cell walls are thus relieved of longitudinal strain resulting from contraction of the material undergoing polymerization. This is particularly important when the cell walls are made of glass in that in the absence of longitudinal strain they are much less subject to breakage.

When removable spacers are employed in accordance with this invention, closing of the edges of the cell by means of a strip of flexible material, such as paper tape, is eliminated. Steel clamps may be used to secure the cell walls to the spacers and thus the construction of the cell is considerably simplified with the result that easier parting of the cell walls and removal of the polymerized sheet therefrom may be more readily accomplished.

Another distinct advantage of this invention over the practice heretofore followed is the elimination of the necessity of having to immerse the cell in a solution to effect removal of the adhesively held paper or tape around the edges thereof. Subsequent washing of the cell walls and polymeric sheets is thus reduced to a minimum.

Other advantages of this invention are that there is less variation in the thickness of the polymerized sheets formed in accordance therewith as contrasted with polymerized sheets formed in cells in which compressible spacers are used. In the latter instance, the action of the monomer causes differential softening of the spacers so that different sized spacers are normally used at different parts of the mold in an attempt to produce sheets having a uniform final thickness. With removable spacers sheets with more uniform edges and of more uniform thickness are obtained. In molds held together with a water-soluble adhesive, when polymerization is to be carried out in a liquid bath, a non-aqueous liquid must be used. No such limitations or restrictions are confronted when operating in accordance with the present invention.

The drawing illustrates the construction of the cells used in practicing my invention.

Fig. 2 is a cross-section through 2—2 of Fig. 1 which illustrates in particular how a sheet of impervious flexible material c may be placed around the inner side of spacers b and between the spacers and the rigid sheets a.

Figure 1:
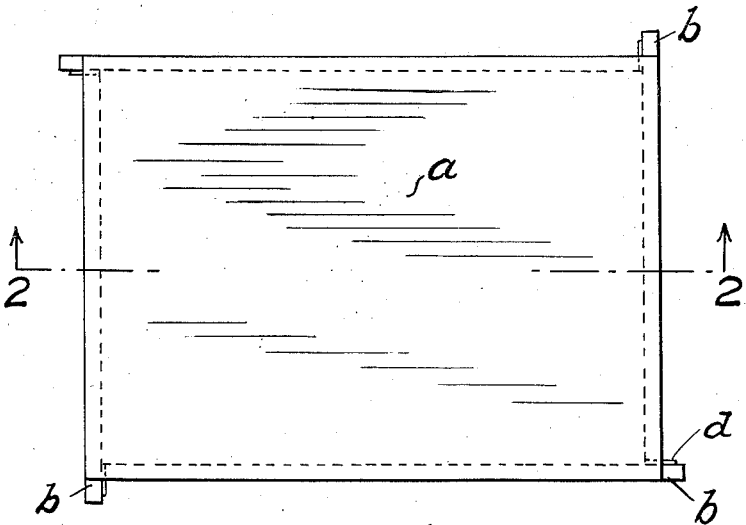
Fig. 1 is a top view of the cell without clamps illustrating how the spacers b are arranged around the edge of the rigid sheets a to form the cell.
Figure 2:
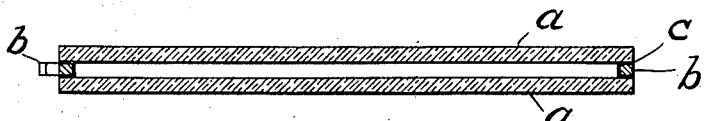
Figure 3:
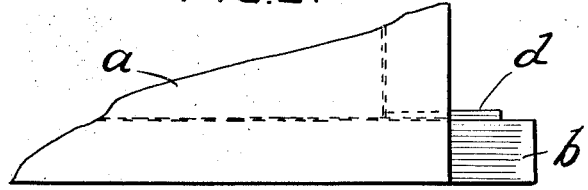
Fig. 3 is an enlarged detail view of a corner of Fig. 1 illustrating how a piece of soft plastic d is inserted where the two spacers b meet to effect a fluid seal.
Figure 4:
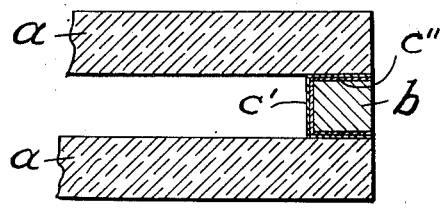
Fig. 4 is an enlarged detail cross-section at 2—2 of Fig. 1 showing how, in addition to the sheet of impervious material c', a layer of paper or other similar material c'' may be placed around the spacers.

My process may be carried out as follows:

A cell is formed using two sheets of plate glass, for example, which are spaced from each other by means of spacers laid along the edges thereof. Such spacers may be of any suitable material, such as metal, wood, phenol-formaldehyde resin, rubber, preferably hard rubber, or the equivalent which will not compress under the action of the heat at which polymerization is to be effected or under the mechanical strain to which the cell is subjected during the process. In order to regulate thickness and to insure a tight fit between the cell walls and the spacers, a layer of paper or other thin material of similar nature may be placed around each of the spacers and a piece of impervious flexible material, such as cellophane, placed around the paper, all as illustrated by c' and c'' in Fig. 4 of the drawing. These also prevent the polymerizing material from coming in contact with the spacers and permit the ready removal of the spacers at the proper time. Clamps are then affixed along the edges of the two sheets held in spaced relation by the spacers, thus forming a fluid-tight seal. Such clamps have not been illustrated in the drawing in order to avoid unnecessarily complicating it. Where two spacers come together, as at the corners of the cells, a suitable plastic filling material is inserted to effect a fluid seal.

After a cell has been assembled, it is placed in a substantially vertical position, and the spacer along the upper edge is either removed entirely or displaced sufficiently to provide an opening through which liquid polymerizable material is introduced into the cell in an amount sufficient to fill same. The spacer along the upper edge is then put back in normal position, but is left unsealed and unclamped until the preliminary heat treatment has been completed.

The filled cell is then supported in a substantially vertical position in an oven, the temperature of which is so regulated that the material undergoing polymerization is held at or near its boiling point, and the cell is permitted to remain in such oven for a relatively short period of time, for example, of the order of from 2 to 30 minutes. During this heating period any dissolved gases are expelled from the monomer but polymerization is not allowed to proceed to any substantial extent. The cell is then removed from the oven and allowed to cool on a rack, during which time it is gradually lowered into a horizontal position.

While the cell is in a vertical position, the hydrostatic head of the monomer causes a slight bulging of the cell walls and allows for an air space above the level of the monomer. As it is gradually lowered into a horizontal position, the bulge is eliminated and the air is forced out of the cell, leaving it completely filled with monomer. When all air has been expelled from the mold, the filling side of the mold is sealed by pressing the spacer into position and clamping it.

The cell is now placed in a horizontal position in a suitable air oven or liquid bath and the heating continued at suitable temperatures. After sufficient polymerization has taken place, and the material has set up as a gel-like mass, the clamps and spacers are removed from the edges of the cell walls without disturbing to substantial extent the layer of paper or other thin material which initially had been placed between the cell walls and the spacers. In the initial polymerization step, the polymerization is carried to the point where the material is thick enough so that at the polymerizing temperature it will not flow from between the two sheets that form the side walls of the cell. Its consistency may vary from a very thick viscous liquid to a gel-like mass. Up to this stage of polymerization very little contraction has taken place and, therefore, rigid spacers may be used.

After removal of the clamps and spacers from the cell, polymerization of the material within the cell is continued in an oven maintained at suitable temperatures until complete.

When polymerization is complete, the cell is allowed to cool, preferably by circulation of a cooling medium therearound. At approximately room temperature the cell walls may be parted with relative ease and the sheet of polymer removed therefrom.

As will be understood, the present invention is applicable to polymerizable materials which form rigid polymers and which adhere to the cell walls during polymerization proper but which, upon completion of polymerization, may be separated therefrom. Such materials, include, for example, vinyl compounds, such as vinyl esters of organic or inorganic acids, unsaturated hydrocarbons, such as styrene or compounds of generally similar character, esters of arcylic and/or methacrylic acid, such as the methyl, ethyl, propyl or butyl ester or esters, as well as other polymerizable materials of like nature, either alone or in admixture. Softening agents, coloring matter, catalysts, polymerization regulators, or other substances which modify the properties of the materials to be polymerized may be employed when one chooses, depending upon the particular modification desired.

A more complete understanding of this invention may be had from the following example:

A sheet of 87% methyl methacrylate and 13% ethyl acrylate containing 0.03% benzoyl peroxide was cast between two sheets of plate glass 31" x 39" using as spacers steel strips 0.094" thick and extending around the entire perimeter of the cell. The spacers were covered with a layer of ordinary wrapping paper to adjust their thickness and then with a layer of Cellophane to serve as an impervious covering. Total thickness of the spacers was 0.115". The cell, after being filled with the monomeric mixture, was placed in an oven at 115° C. for 16 minutes to induce polymerization, whereupon it was removed and polymerization permitted to continue at a lower temperature until a relatively soft gel had formed. The steel strips were then removed, and polymerization was continued until complete. Upon removal of the sheet of polymer from the cell it was found that the sheet had an average thickness of 0.101" and varied at the edge in thickness from 0.100" to 0.104". It was free of bubbles and surface defects.

I claim:

1. The process of manufacturing sheets of polymeric material which comprises forming a cell of two sheets of rigid material spaced from each other about their perimeters by spacers held in fluid-tight engagement between said two sheets, filling the space between the two sheets with polymerizable material capable of forming a rigid polymer, causing polymerization of said material to take place until a thick viscous liquid to gel-like mass is formed, removing the spacers from between the sheets forming the cell walls and continuing polymerization until a rigid sheet of polymer is formed, cooling the cell and removing the polymerized sheet therefrom.

2. The process of manufacturing sheets of polymeric material which comprises forming a cell of two sheets of rigid material spaced from each other about their perimeters by spacers having strips of impervious flexible material extending from between the sheets of rigid material and the spacers around the inner side of the spacers, filling the space between the two sheets with polymerizable material which when polymerized forms a rigid polymer, polymerizing said material until a thick viscous liquid to gel-like mass is formed, removing the spacers from between the sheets forming the cell walls and continuing polymerization until a rigid sheet of polymer is formed, cooling the cell and removing the polymerized sheet therefrom.

3. The process of manufacturing polymeric methyl methacrylate sheets which comprises forming a cell of two sheets of rigid material spaced from each other about their perimeters by spacers having a strip of impervious flexible material extending from between the sheets of rigid material and the spacers around the inner side of the spacers, filling the space between the two sheets with a polymerizable material consisting principally of methyl methacrylate monomer, causing polymerization of the polymerizable material to take place until a thick viscous to gel-like mass is formed, removing the spacers from between the sheets while leaving the strips of impervious material in place and continuing polymerization until a rigid sheet of polymer is formed, cooling the cell and removing the polymerized sheet therefrom.

CHARLES B. EGOLF.